United States Patent [19]

Rowe et al.

[11] Patent Number: 4,982,122
[45] Date of Patent: Jan. 1, 1991

[54] METHOD AND APPARATUS FOR INSULATING LIQUID-COOLED STATOR COIL HEADERS AND CONNECTORS

[75] Inventors: Charles M. Rowe, Orlando; Hector O. Ponce, Winter Park; Leonard B. Simmonds, Winter Springs; Emil M. Fort, Maitland, all of Fla.

[73] Assignee: Westinghouse Electric Corp., Pittsburgh, Pa.

[21] Appl. No.: 338,354

[22] Filed: Apr. 12, 1989

Related U.S. Application Data

[63] Continuation of Ser. No. 7,197,179, May 23, 1988, abandoned.

[51] Int. Cl.$^5$ ............................ H02K 3/22; H02K 3/50
[52] U.S. Cl. ........................................ 310/54; 310/260
[58] Field of Search ............................ 310/43, 54, 260

[56] References Cited

U.S. PATENT DOCUMENTS

| | | | |
|---|---|---|---|
| 4,586,625 | 5/0686 | Garrett | 11/45 |
| 4,598,463 | 7/1986 | Gerlach et al. | 310/43 |

FOREIGN PATENT DOCUMENTS

| | | | |
|---|---|---|---|
| 0094552 | 7/1980 | Japan | 310/260 |
| 1390244 | 4/1975 | United Kingdom | 310/260 |

*Primary Examiner*—Steven L. Stephan
*Assistant Examiner*—Judson H. Jones

[57] ABSTRACT

An improved method and apparatus for preventing electrical shorts between sets of stator coil headers and accompanying connections is disclosed in which a reinforced, non-conducting cover is fitted over a pair of stator coil headers, or a stator coil header and an adjacent phase connector. Thereafter, the cavity formed by the fitted cover can be filled with an insulating, solidifying or polymerizing material or resin. Use of such an apparatus insulates the entire header apparatus and prevents any accidental shorting between sets of stator coil ends.

16 Claims, 2 Drawing Sheets

METHOD AND APPARATUS FOR INSULATING LIQUID-COOLED STATOR COIL HEADERS AND CONNECTORS

This is a continuation, of application Ser. No. 197,179, filed May 23, 1988.

BACKGROUND OF THE INVENTION

1. Field of the Invention

The present invention relates to the field of turbine generator insulation systems. More specifically, it relates to an improved electrical insulator for stator coil headers and connections and a method for so insulating.

2. Description of the Prior Art

Turbine generators generally produce electric power by rotating a magnet inside coils of copper wires. The rotation of the magnet produces an electrical current within the copper stator coils. The stator has a multitude of slots spaced around its circumference, often having in the neighborhood of 50 such slots. Each slot typically holds a pair of stator coils. Such stator coils are generally comprised of a multitude of copper wires typically interspersed with special water cooling wires that are constructed to allow liquid to flow within them, thereby to cool the stator coil. (Other stator coils utilize hollow tubes and gas cooling.) Even these water cooling wires are conductive.

At the ends of the stator, each coil is connected to another coil in an adjacent slot such that the set of coils is connected in series. In addition, each coil has a header that connects to a main water manifold. The connecting piping is typically made of a non-conductive material such as Teflon TM.

While the piping from the headers to the water manifold is generally non-conductive, the headers themselves are conductive. Thus, problems of electrical shorting between adjacent unconnected headers can arise. Such shorting could occur if a small piece of metal or other conductive material falls between the two headers, thereby bridging the gap and allowing conduction. To avoid this problem, present methods of insulation consist of applying silicone rubber paste around the header, fitting a cured silicone rubber cover over the header, and then taping over the cover and series connection with a glass tape. Finally, an epoxy resin is brushed on and allowed to cure. Insulating such connections on large turbine generators using these methods can take from seven to nine days.

In addition to the series connections, banks of stator coils are connected with other banks in phase connections. At the present time, the phase coil ends and connections are hand taped with multiple layers of tape, typically made of mica, and then brushed with resin.

In addition to the time consuming nature of the initial insulation process, should maintenance be required on the stator coils or headers, removal of the installed insulation can be just as time consuming. Once maintenance is completed, reinsulation must be performed, involving further extensive labor.

Accordingly, there exists a need for a method and product for electrically insulating stator coil connections and headers economically and efficiently while allowing for economical and efficient maintenance procedures.

SUMMARY OF THE INVENTION

The present invention is directed to an insulation system for stator coil connections and headers that is easy to install and use, thereby avoiding high labor costs, while avoiding excessive maintenance costs. To this end, a reinforced composite material cover that is open-ended is fitted over a stator coil connection, extending to cover both the connection and the liquid cooling headers. The interior of this fitted cover is thereafter preferably filled with an insulating polymerizing material or resin.

Accordingly, it is an object of the present invention to provide a stator coil connection insulation system that can be easily and economically installed. Other and further objects and advantages will appear hereinafter.

DETAILED DESCRIPTION OF THE PREFERRED EMBODIMENTS

Figure 1:
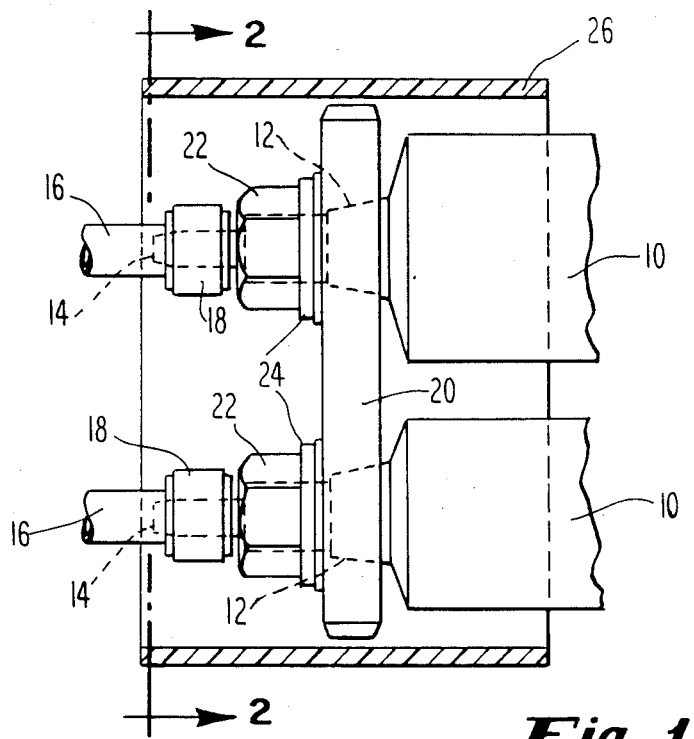
FIG. 1 is a side cutaway view of a fitted cover in accordance with the present invention used in conjunction with a stator coil series connection.
Figure 2:
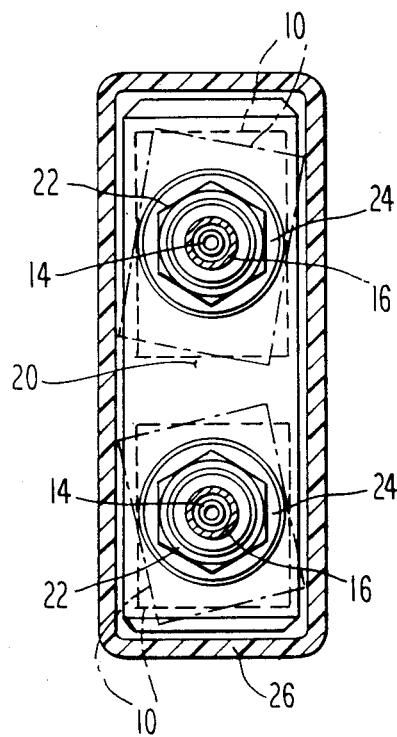
FIG. 2 is a view of the fitted cover and series connection taken across section 2—2 of FIG. 1.

Turning in detail to the drawings, where like numbers refer to like items, FIGS. 1 and 2 represent side and head-on views, respectively, of the headers and connection of a typical pair of stator coils utilizing the apparatus of the present invention. Other configurations are possible and do not affect the method and apparatus of the present invention. FIG. 2 is a view taken across section 2—2 of FIG. 1. A pair of stator coil headers 10 collect or distribute water to the water cooling tubes of their respective stator coils (not shown). Such stator coil headers 10 are typically manufactured of electrically conducting copper. Each of the stator coil headers 10 are integrally connected to a tube portion 12 that terminates in a nozzle 14. These nozzles 14 are then connected to piping 16 that carries cooling water to and from the main water manifold (not shown). The piping 16 is typically non-conductive and is commonly manufactured of Teflon TM hose. While the manner of connection of the piping 16 to the nozzle 14 is not critical, often a metal clip mechanism 18 is used.

In order to electrically connect the adjacent stator coils, a copper connecting bar 20, having a pair of holes, is fitted over the adjacent pair of stator coil headers 10. This connecting bar 20 is fitted to the stator coil headers and is tightened onto those stator coil headers 10 by nuts 22. If necessary, spacing washers 24 can also be used. Again, the method of electrically connecting the stator coil headers 10 is not critical to the method and apparatus of this present invention and is described herein by way of example only.

Coming now to the apparatus of the present invention, a reinforced non-conducting cover 26 is fitted around the connected pair of stator coil headers 10. The cover 26 is open on both ends and is of sufficient depth that it can cover both the stator coil headers 10 and any metal clip mechanisms 18 that may be used to connect the nozzles 14 to the water piping 16. The cover is preferably made of reinforced composite, but any stiff, non-conducting material may be used.

The connecting bar 20 preferably has dimensions such that it completely covers both stator coil headers 10 when viewed across section 2—2 as in FIG. 2. If the connecting bar 20, and thus the reinforced cover 26, are large enough, then the stator coil headers 10 are allowed some variation in their orientation. Therefore, any minor changes in orientation, as shown by the phantom lines in FIG. 2, will not prevent the method and apparatus of the present invention from operating.

By covering the stator coil headers 10 and their accompanying connections, any possibility of accidental bridging between adjacent sets of stator coils is eliminated. To further ensure this result, a solidifying or polymerizing material or resin can be pumped into the cavity formed by the non-conducting cover 26. Once this material or resin solidifies, the entire header apparatus will be isolated from adjacent sets of stator coil apparatus.

Figure 3:
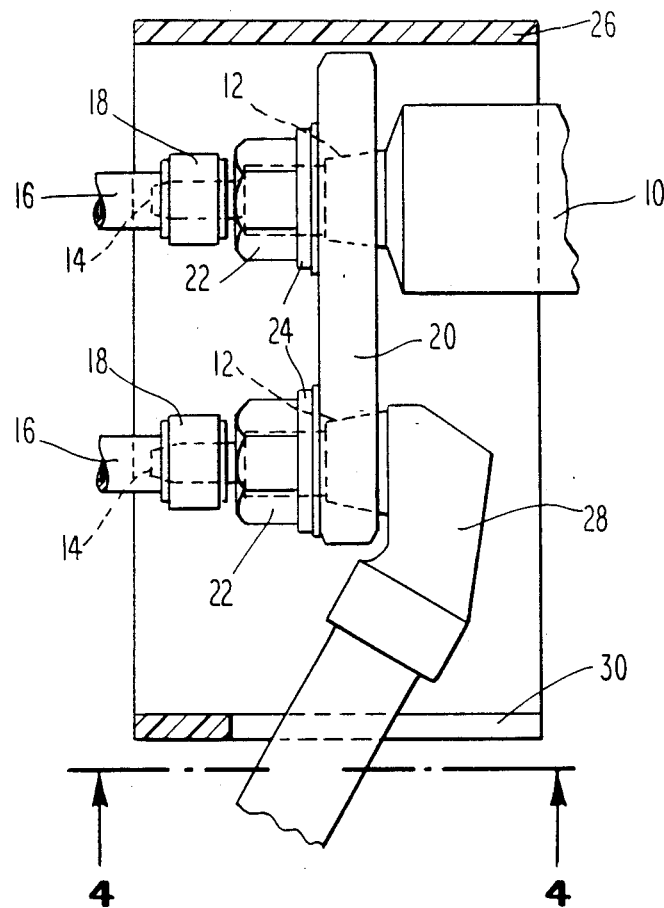
FIG. 3 is a side cutaway view of a fitted cover in accordance with the present invention in conjunction with a stator coil/phase connection.
Figure 4:
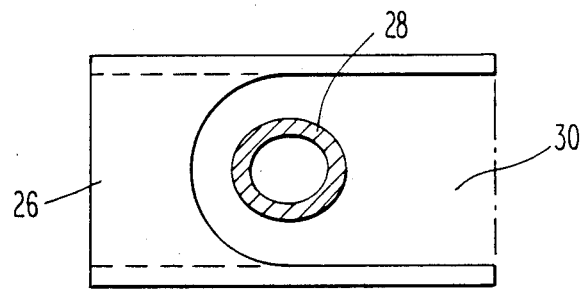
FIG. 4 is a bottom view of the fitted cover and stator coil connection taken across section 4—4 of FIG. 3.

Turning now to FIGS. 3 and 4, FIG. 3 depicts a side view of a phase connection in conjunction with a stator coil header utilizing the apparatus of the present invention. A stator coil header 10 having a tube portion 12 and nozzle 14, connected by metal clip mechanism 18 to piping 16, in this case is connected by connecting bar 20, to phase connector 28. Phase connector 28 also has a tube portion 12 and a nozzle 14 and 28 is connected by metal clip mechanism 18 to piping 16. Finally, connecting bar 20 is tightened onto stator coil header 10 and phase connector 28 by nuts 22 and spacing washers 24.

In the case of a phase connection setup, phase connector 28 acts to connect one bank of stator coil headers to another. Thus, phase connector 28, rather than connecting directly to a paired stator coil header 10, connects to an adjacent bank of stator coils (not shown). A reinforced, insulating cover 26 is once again fitted over the stator coil header 10 and accompanying header apparatus and, in this case, over phase connector 28 and accompanying apparatus. In order to accommodate phase connector 28, a portion of the non-conducting cover 26 is removed so that phase connector 28 may pass through said cover 26. FIG. 4 shows a bottom view of the apparatus of FIG. 3 taken across section 4—4 of FIG. 3 and illustrates a removed section 30 of non-conducting cover 26 allowing phase connector 28 to pass through and connect to an adjacent bank of stator coils.

Once again, the cavity formed by the nonconducting cover 26 can be filled with a solidifying or polymerizing material or resin that is thereafter allowed to solidify or polymerize.

A primary feature of the present apparatus and method is the speed in which it allows stator coil headers to be insulated. While previous methods involved installation times of up to nine days, the apparatus of the present invention reduces installation time to approximately 24 hours per generator. Further, should maintenance be required on a particular stator coil or stator coil header 10, the non-conducting cover 26 can be removed and the insulating material can be cut off. In addition, since the non-conducting covers 26 are hollow on both ends, they can be manufactured as a single, long tube. Thereafter, they can be cut into shorter pieces of appropriate depth to act as the non-conductive covers 26.

While the preferred embodiment of the present invention involves a non-conducting cover 26 that has interior dimensions only slightly larger than the outer dimensions of the connecting bar 20, it is clear that such non-conductive covers 26 can be formed in a wide variety of shapes and sizes without departing from the inventive concept herein. For example, it would be possible to construct such covers with adjustable sides so that they can be adjusted to cover more than two coils at one time. While such an adjustable cover has the advantage of flexibility of use, it is noted that it also increases both the time and cost of manufacture and the time of installation.

Having thus described the invention, it is to be understood that the invention is not limited to the embodiments set forth herein for purposes of exemplification, but is to be limited only by the scope of the attached claims, including a full range of equivalents to which each claim thereof is entitled.

We claim as our invention:

1. An apparatus for preventing electrical shorts between sets of stator coil water-cooling headers having associated connections comprising:
   an open-ended, tubular insulating cover having a substantially constant cross-section fitted over a pair of stator coil headers having an associated connection wherein the cover extends over the stator coil headers and associated connections.

2. The apparatus of claim 1 wherein the fitted cover is filled with an insulating, solidifying or polymerizing material or resin.

3. The apparatus of claim 1 wherein the insulating cover is comprised of reinforced composite.

4. The apparatus of claim 1 wherein the insulating cover is used to insulate stator coils connected in phase with other stator coils by having a portion of a wall of said insulating cover removed to allow a phase connector to pass through said wall of said insulating cover.

5. The apparatus of claim 1 wherein the insulating cover has sides that are adjustable in length so that the insulating cover can be tightly fitted around said pair of stator coil ends.

6. A generator with a plurality of water-cooled stator coils wherein pairs of said stator coils are connected by a connector and are insulated from other pairs of said stator coils by an open-ended, tubular insulating cover having a substantially constant cross-section that is fitted over a pair of said stator coils and extends over said stator coil connectors.

7. The generator of claim 6 wherein the fitted covers are filled with an insulating material or resin.

8. The generator of claim 6 wherein the fitted covers are comprised of reinforced composite.

9. The generator of claim 6 wherein the insulating cover is used to insulate stator coils connected in phase with other stator coils by having a portion of a wall of said insulating cover removed to allow a phase connector to pass through said wall of said insulating cover.

10. The generator of claim 6 wherein the insulating cover has sides that are adjustable in length so that the insulating cover can be tightly fitted around said pair of stator coil ends.

11. A method of insulating stator coil headers wherein pairs of said stator coil headers are connected by a connector comprising:
   insulating a pair of stator coil headers from other pairs of said stator coil headers by fitting an open-ended, tubular insulating cover having a substantially constant cross-section over a pair of said stator coil headers prior to connecting said stator coil headers to a main water manifold wherein said insulating cover extends over said stator coil connector.

12. The method of claim 11 wherein the fitted cover is filled with an insulating material or resin after being fitted over said stator coil headers.

13. The method of claim 11 wherein the fitted cover is comprised of reinforced composite.

14. The method of claim 11 wherein the insulating cover is used to insulate stator coils connected in phase with other stator coils by removing a portion of a wall of said insulating cover to allow a phase connector to pass through said wall of said insulating cover.

15. The method of claim 11 wherein the insulating cover has sides that are adjustable in length and the insulating cover is tightly fitted around said pair of stator coil ends.

16. An apparatus for preventing electrical shorts between sets of stator coil water-cooling headers having associated connections comprising:
   an open-ended, tubular insulating cover comprised of reinforced composite and having a substantially constant cross-section wherein the insulating cover has sides that adjustable in length;
   the insulating cover fitted over a pair of stator coil headers having an associated connection wherein the cover extends over the stator coil headers and associated connections; and
   an insulating, solidifying or polymerizing material or resin filling said fitted cover.

* * * * *